No. 675,127. Patented May 28, 1901.
J. A. COLE.
COUPLING FOR CONDUIT OUTLET BOXES.
(Application filed Sept. 15, 1900.)
(No Model.)
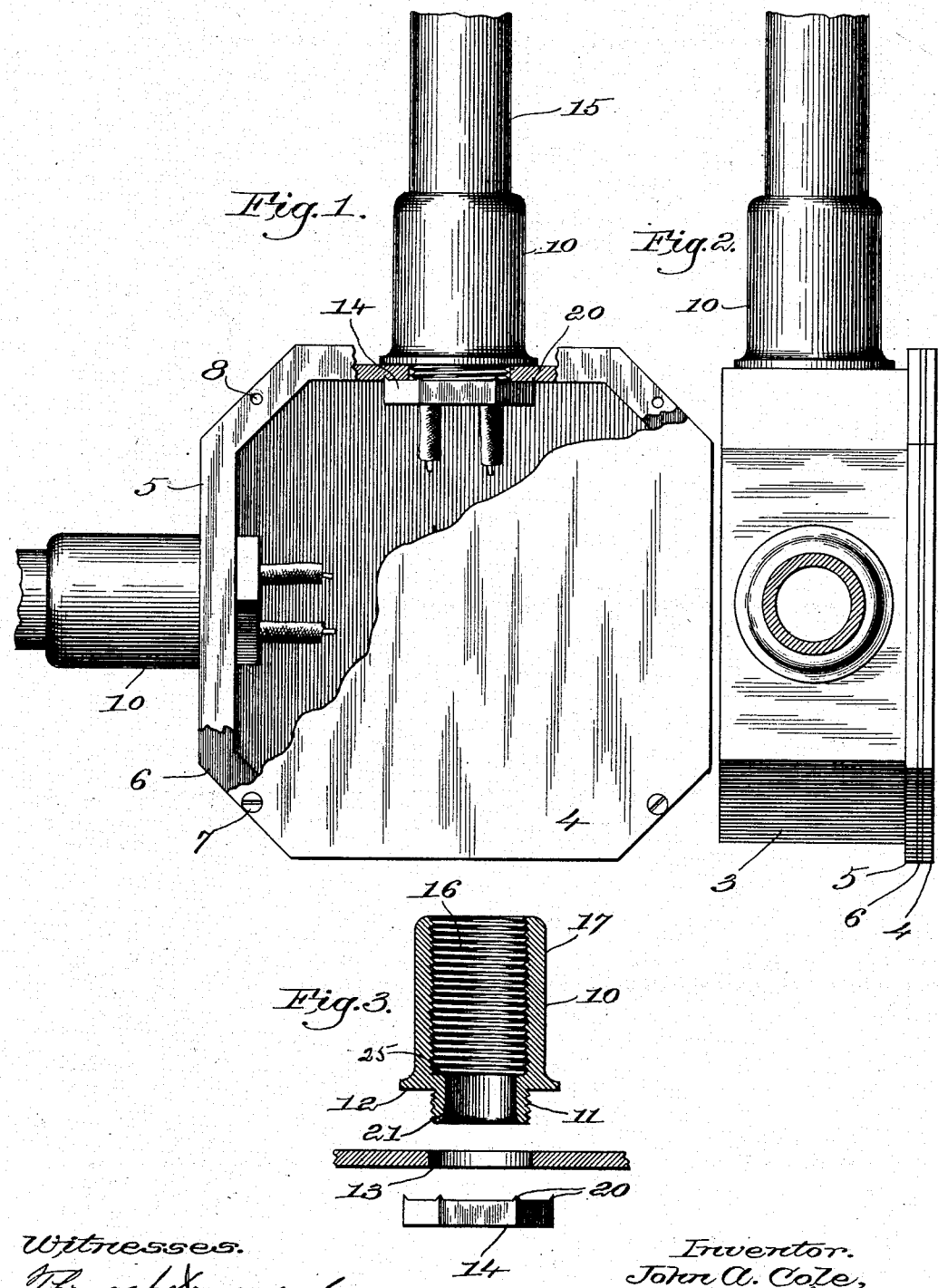

UNITED STATES PATENT OFFICE.

JOHN APPLETON COLE, OF BOSTON, MASSACHUSETTS.

COUPLING FOR CONDUIT OUTLET-BOXES.

SPECIFICATION forming part of Letters Patent No. 675,127, dated May 28, 1901.

Application filed September 15, 1900. Serial No. 30,162. (No model.)

*To all whom it may concern:*

Be it known that I, JOHN APPLETON COLE, a citizen of the United States, and a resident of Boston, county of Suffolk, State of Massachusetts, have invented an Improvement in Couplings for Conduit Outlet-Boxes, of which the following description, in connection with the accompanying drawings, is a specification, like figures on the drawings representing like parts.

This invention relates to couplings for conduit outlet-boxes such as are used in systems of house-wiring.

It is the common practice at present in wiring a house for electric lamps or other purposes to provide the walls of the house with suitable conduits, generally of gas-pipe, which may be lined with some suitable insulating material, and to use such conduits for carrying the wires from one place to another, the conduits terminating at the places where they are brought to the surface of the walls in outlet-boxes, said outlet-boxes being of a variety of shapes and of various constructions, according to the particular use to which they are applied. In the construction of such outlet-boxes it is essential that they be made water-tight and also that the conduit have a perfect electrical connection with the box, so that the entire system may be grounded.

It is the object of my invention to provide a coupling for connecting the conduit to an outlet-box which will be water-tight and which will insure an electrical connection between the conduit and outlet-box.

The outlet-box which I preferably use will have one or more openings in its sides, according to the requirements of the place where it is to be used, and I may, if desired, make my box of such a material that the said openings may be punched in the sides of the box when the box is put in place, and in these openings suitable couplings are secured, the couplings having connected thereto the conduits which support the wires.

I may make my couplings of some suitable non-corrosive material, if desired.

The couplings are each made with a reduced portion at one end, said reduced portion terminating in a shoulder or flange and being adapted to be inserted into the opening in the side of the box, the flange or shoulder abutting against the box, and suitable means are provided for holding said shoulder tightly against the box, said means being so constructed as to make a perfect electrical connection between the coupling and the box.

Figure 1 is a view of one form of box with my couplings attached thereto, the cover and one side of the box being partially broken away. Fig. 2 is a side elevation of the parts shown in Fig. 1, and Fig. 3 is a detail of the coupling.

The outlet-box is designated by 3, and this will be made of various shapes, according to the requirements of the particular place where it is to be used, the outlet-box illustrated in the drawings being an octagonal box.

I preferably make my outlet-box of some suitable non-corrosive material—such, for instance, as an alloy of aluminium—the said outlet-box being made from a single piece or blank by pressing or stamping it into shape by means of suitable dies, thus making a seamless outlet-box and one which is absolutely water-tight.

In construction of the box the sides of the box are integral—that is, they are made solid without any openings therein—the opening for the couplings being punched in the side of the box by any suitable mechanism when the box is about to be placed in position, the material used in making the box being such as can be easily punched.

By making my box of an alloy of aluminium, which is non-corrosive, the life of the box is lengthened, since there is no danger of its rusting away, nor is there any danger of rust accumulating between the box and the coupling, as in the case of iron or other material.

The cover 4 will of course be of any suitable construction, such construction varying according to the particular use to which the box is applied, and in the drawings I have merely represented a plain cover to show the way in which the cover is attached to the box, it being understood, of course, that my invention is not limited to the particular form of cover, but only to the way in which the cover is attached to the box.

In order to make a water-tight connection between the cover and the outlet-box, I provide my outlet-box at its top or open side with the outwardly-projecting flange 5, which flange forms a seat extending entirely around the box, on which the cover is adapted to rest, and preferably I provide a gasket 6, of any suitable material, which is placed between the cover and the flange 5, the cover being fastened to the flange by any suitable means, such as screws 7, passing through the cover and screwing into apertures 8 in said flange. By means of this construction the cover makes a perfectly water-tight joint with the outlet-box, which is an essential feature in devices of this nature.

The coupling member is designated by 10, and this is also preferably made of a suitable non-corrosive material—such, for instance, as that specified above—and it presents at one end the reduced portion 11, which terminates in the flange or shoulder 12, the said reduced portion being adapted to be inserted through the opening 13 in the side of the box and said shoulder or flange 12 abutting against the outlet-box, as illustrated in Fig. 1. The shoulder or flange 12 is made square, so that it fits accurately against the side of the outlet-box, and in order to clamp it firmly in such position to thereby make a water-tight joint between the coupling and the box I preferably provide the reduced portion 11 with exterior screw-threads, upon which a nut 14 is adapted to screw, thereby clamping the outlet-box side firmly between the nut and shoulder 12. The end of the coupling member opposite the reduced portion 11 is connected to the conduit 15 by making the coupling member with the elongated cylindrical portion 17, which is provided with interior screw-threads 16, which are adapted to engage exterior screw-threads on the end of the conduit 15, the long cylindrical portion 17 of the coupling member providing means for adjusting the relative positions of the conduit and outlet-box without detaching one from the other. As seen in Fig. 3, the interior screw-threaded portion of the coupling 10 terminates in the shoulder 25, said shoulder being preferably of a depth equal to the thickness of the material in the conduit, so that when the conduit is screwed into the coupling the end thereof will abut against the shoulder 25 and the interior bore thereof will present a smooth and continuous surface with the bore of the reduced portion 11, whereby the system will present a continuous and smooth surface for the wires from one outlet to the other.

In perfect house-wiring systems it is essential that the conduits and boxes be grounded, and it is therefore necessary to provide means for insuring perfect electrical contact between the conduits and boxes. I have provided means for thus electrically connecting the conduits and boxes by providing the inside of the nut 14 with suitable points 20, which as the nut is screwed up to clamp the outlet-box between it and the flange 12 cut into the side of the outlet-box, as illustrated in Fig. 1, thereby cutting through any rust or paint or other material which may be on the inside of the box and forming a perfect electrical connection between the outlet-box and the nut. The nut, of course, by its screw-threaded engagement with the coupling 10, has an electrical connection therewith, and the coupling is electrically connected with the conduit.

The interior bore of the reduced portion 11 of the coupling member is provided with a coating of any suitable insulated material 21, so that the wires contained in the conduit and merging from the coupling will be thoroughly insulated from the outlet-box.

As is usual with this class of devices, the bore of the coupling member where it merges into the box is made round, as shown in Fig. 3, so that the insulating material on the wires will not be injured by being drawn over a sharp edge.

It will be obvious that changes may be made in my device, as illustrated in the drawings, without departing from the spirit of my invention as expressed in the appended claims.

Having described my invention, what I claim as new, and desire to secure by Letters Patent, is—

1. A coupling for conduit outlet-boxes, comprising a coupling member having at one end an interiorly-screw-threaded portion into which the end of a conduit is adapted to be screwed, and at the opposite end a reduced portion terminating in a square shoulder or flange, said reduced portion being adapted to be inserted in an opening in the side of an outlet-box, and the shoulder adapted to abut against the outside of the box, and means on the reduced portion adapted to engage the inside of the box and to clamp the side of the outlet-box between the same and the shoulder, to thereby form a water-tight joint.

2. A coupling for conduit outlet-boxes, comprising a coupling member made of non-corrosive material having at one end a reduced portion terminating in a square shoulder or flange, said reduced portion being adapted to be inserted in an opening in the side of an outlet-box, and means on said reduced portion adapted to clamp the side of the box between the same and the shoulder, whereby a water-tight connection is made, the opposite end of the coupling member being interiorly screw-threaded to receive the end of a conduit, said coupling having an interior shoulder against which the end of the conduit is adapted to abut, whereby a continuous smooth surface is presented to the wires from outlet to outlet.

3. A coupling for conduit outlet-boxes, comprising a coupling member having at one end a reduced screw-threaded portion terminating in a square shoulder or flange, said reduced portion being adapted to be inserted in the side of an outlet-box, a nut on the said reduced portion adapted to clamp the side of the box between the same and the shoulder, and means for insuring an electrical connection between the nut and the box.

4. A coupling for conduit outlet-boxes, comprising a coupling member made of non-corrosive material, having at one end a reduced screw-threaded portion terminating in a square shoulder or flange, said reduced portion being adapted to be inserted in an opening in the side of an outlet-box, a nut on the said reduced portion adapted to clamp the side of the box between the same and the shoulder, to thereby form a water-tight joint, the said nut having a series of points which cut into the outlet-box side as the nut is screwed up to thereby insure an electrical connection between the coupling and the outlet-box.

5. In a coupling for conduit outlet-boxes, a coupling member, and a nut engaging therewith to secure the same to the outlet-box, said nut having a series of points on one face which are adapted to cut into the side of the outlet-box to thereby insure perfect electrical connection.

In testimony whereof I have signed my name to this specification in the presence of two subscribing witnesses.

JOHN APPLETON COLE.

Witnesses:
JOHN C. EDWARDS,
LOUIS C. SMITH.